United States Patent [19]
Lindell

[11] Patent Number: 5,239,758
[45] Date of Patent: Aug. 31, 1993

[54] HAND DRILL POWERED MINI CHAIN SAW

[76] Inventor: Lester G. Lindell, Box 444, Dufur, Oreg. 97021

[21] Appl. No.: 870,917

[22] Filed: Apr. 20, 1992

[51] Int. Cl.$^5$ .............................................. B23B 51/00
[52] U.S. Cl. ........................................ 30/500; 30/122; 30/383; 83/824
[58] Field of Search ................ 30/500, 387, 122, 383, 30/382, 123.4; 7/158, 170; 83/574, 820, 821, 824; 198/841

[56] References Cited

U.S. PATENT DOCUMENTS

| | | | |
|---|---|---|---|
| 2,714,905 | 8/1955 | Clayton | 30/500 |
| 2,774,395 | 12/1956 | Tweedie | 83/824 |
| 3,064,698 | 11/1962 | La Force | 83/824 |
| 3,191,646 | 6/1965 | Merz | 30/387 |
| 3,416,578 | 12/1968 | Orgens | 30/387 |
| 3,885,837 | 5/1975 | Mellor | 198/841 |
| 4,290,330 | 9/1981 | Washio et al. | 83/824 |
| 4,317,282 | 3/1982 | Pace | 30/500 |
| 4,317,285 | 3/1982 | Graham | 30/382 |
| 4,819,335 | 4/1989 | Alexander | 30/122 |
| 4,837,934 | 6/1989 | Krohn | 30/387 |
| 4,996,774 | 3/1991 | Burger et al. | 30/123.4 |

Primary Examiner—Frank T. Yost
Assistant Examiner—Hwei-Sin Payer
Attorney, Agent, or Firm—Lee R. Schermerhorn

[57] ABSTRACT

A sawing device is attachable to an electric hand drill. The hand drill can be operated by either alternating current or direct current, using a battery. The battery operated drill eliminates the need for electrical cords, so it can be used anywhere. The saw bar may be made of material such as plastic that requires no lubricating oil, is lighter and less abrasive than conventional metal saw bars. There is also a non-metallic insert that will attach to a metal saw bar. This insert may go into the conventional metal saw bars with the same advantages as above. The hand drill rotation is transferred through a connecting shaft to the sprocket that drives the cutting chain, which travels on a chain bar with a single sprocket.

8 Claims, 3 Drawing Sheets

HAND DRILL POWERED MINI CHAIN SAW

This invention relates to a small chain saw powered by a conventional hand drill.

BACKGROUND OF THE INVENTION

Numerous attachments to power tools heretofore have been provided that are each adapted to be directly connected to a power tool so as to be operated therefrom.

For example, U.S. Pat. No. 2,860,671 discloses a chain saw attachment for portable circular saws. This saw is worm driven, which is quite expensive. The attachment of the chain saw to this circular saw costs three to four times as much as the present chain saw.

U.S. Pat. No. 2,703,928 discloses a chain saw attachment for use with an air powered rotary tool. This device lacks the adaptability of the present saw that can be used with any hand drill.

The present conventional chain saws, whether gas or electric, are heavier, cumbersome and more costly than the present saw.

SUMMARY OF THE INVENTION

This invention relates to power tool attachments capable of attaching to a rotary power source such as a hand drill. More particularly, this invention relates to a chain saw that is small, light weight and very economically manufactured.

It is primarily used for yard work, such as pruning shrubs and trees. The tool works very well for trimming hedges, and there are special branch stoppers that bolt onto the saw bar for this purpose.

It should be further understood that the tool will do the work of three yard tools: hedge trimmer, pruner and saw.

The invention will be better understood and additional features and advantages will become apparent from the following description of the preferred embodiments illustrated in the accompanying drawings. Various changes may be made however in the details of the construction and arrangement of parts and certain features may be used without others. All such modifications within the scope of the appended claims are included in the invention.

DESCRIPTION OF THE PREFERRED EMBODIMENT

Figure 1:
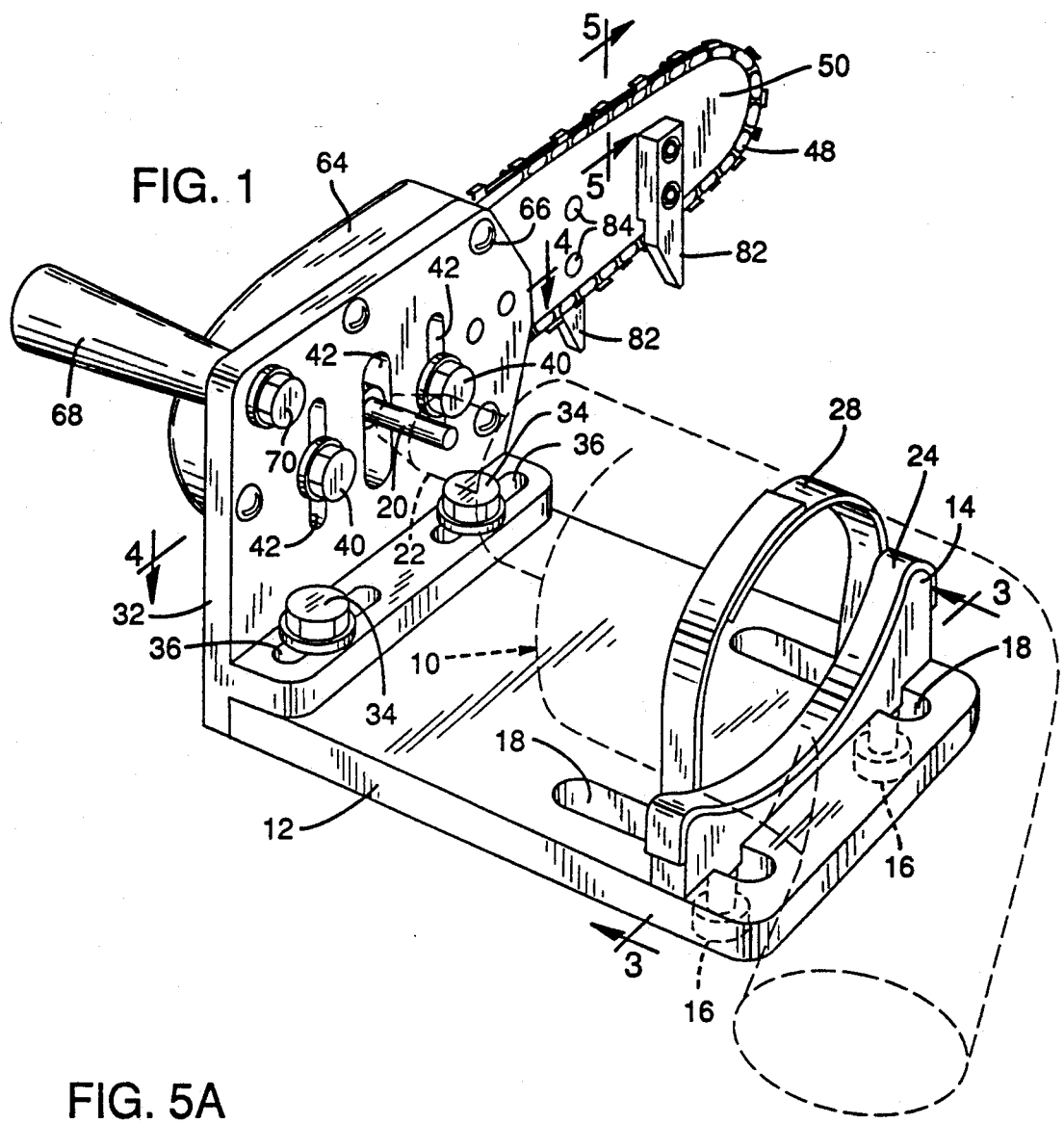
FIG. 1 is a perspective view of the invention.
Figure 2:
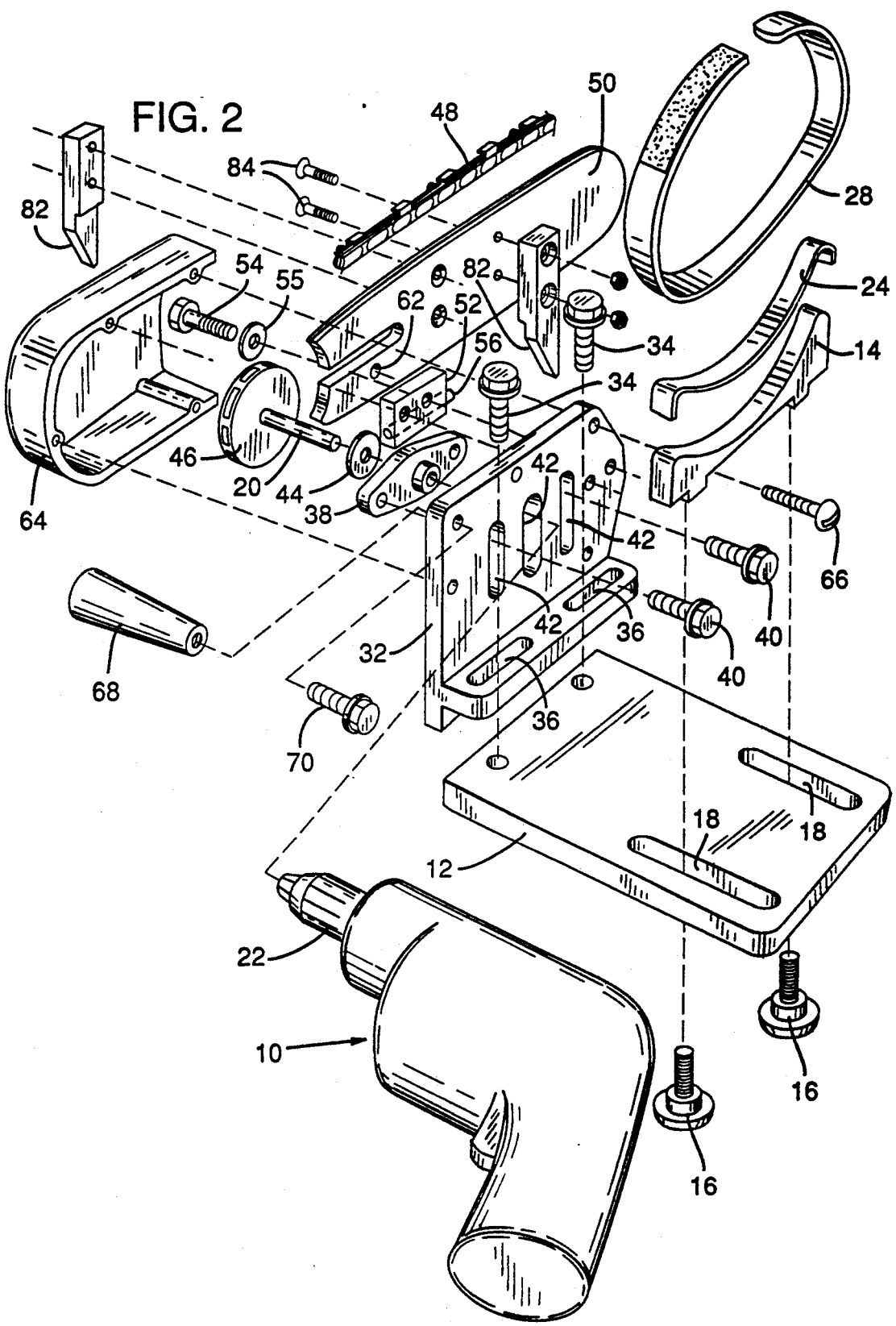
FIG. 2 is an exploded view.

FIGS. 1 and 2 show a sawing device attachable to a conventional electric drill 10, comprised of base plate 12 on which the cradle 14 is attached by bolts 16. Slots 18 allow for adjustment of the electric drill when attaching it to shaft 20. The chuck 22 on the electric drill 10 attaches to the drive shaft 20 as shown in FIG. 1.

Figure 3:
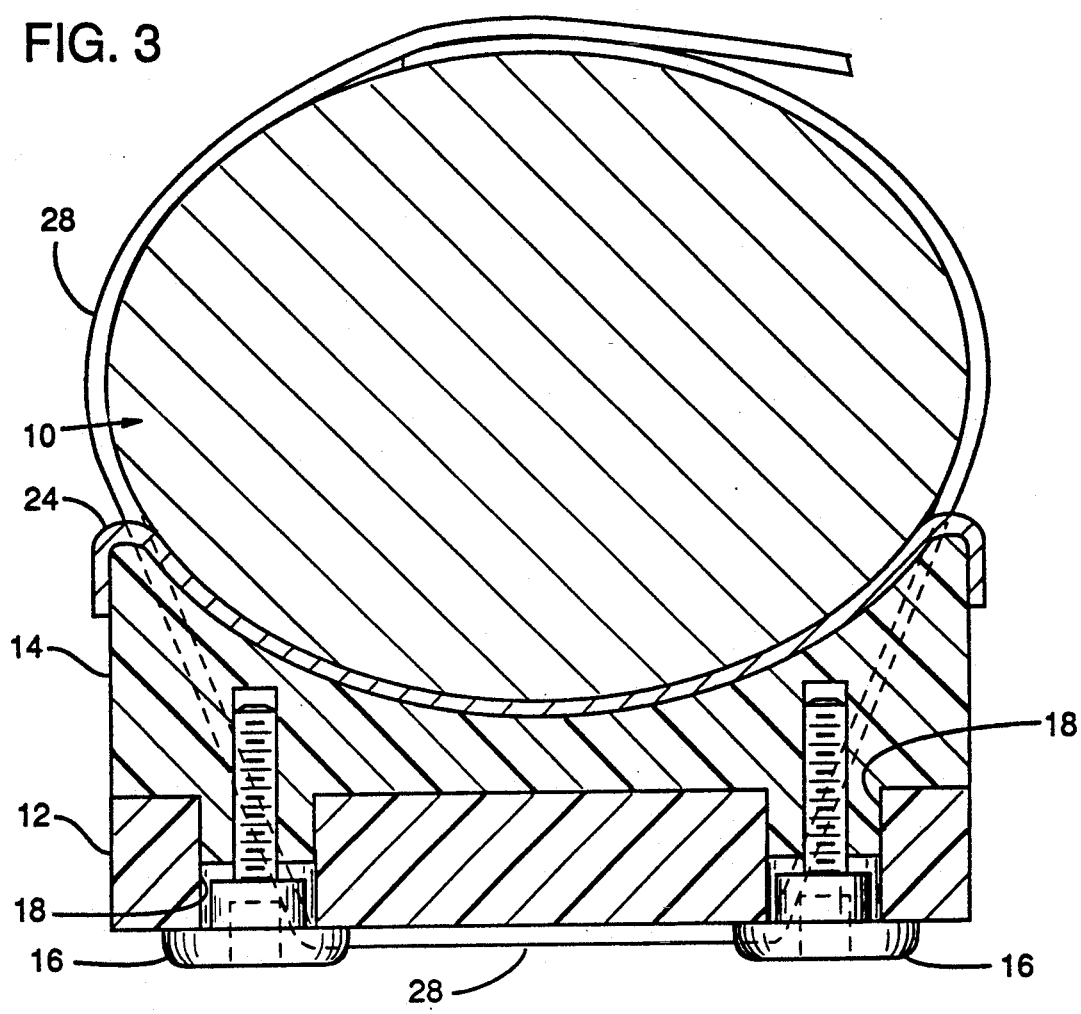
FIG. 3 is a cross sectional view of the mounting of the hand drill on the line 3—3 in FIG. 1.

FIG. 3 shows a felt strip 24 attached to the cradle 14 and the Velcro strap 28 secures the electric drill 10 to the cradle. The slotted holes 18 allow for the different length hand drills.

The vertical support 32 is attached to the base plate 12 with two bolts 34 which pass thru the slotted holes 36 allowing for horizontally aligning the electric drill 10 to the drive shaft 20.

The drive shaft 20 passes through bearing 38. Bearing 38 is attached to the vertical support 32 by bolts 40 which pass thru the slotted holes 42, allowing for vertical alignment of electric drill 10 to the drive shaft 20. A spacer washer 44 is placed on the drive shaft between bearing 38 and drive sprocket 46, which is fastened to the drive shaft 20.

Figure 4:
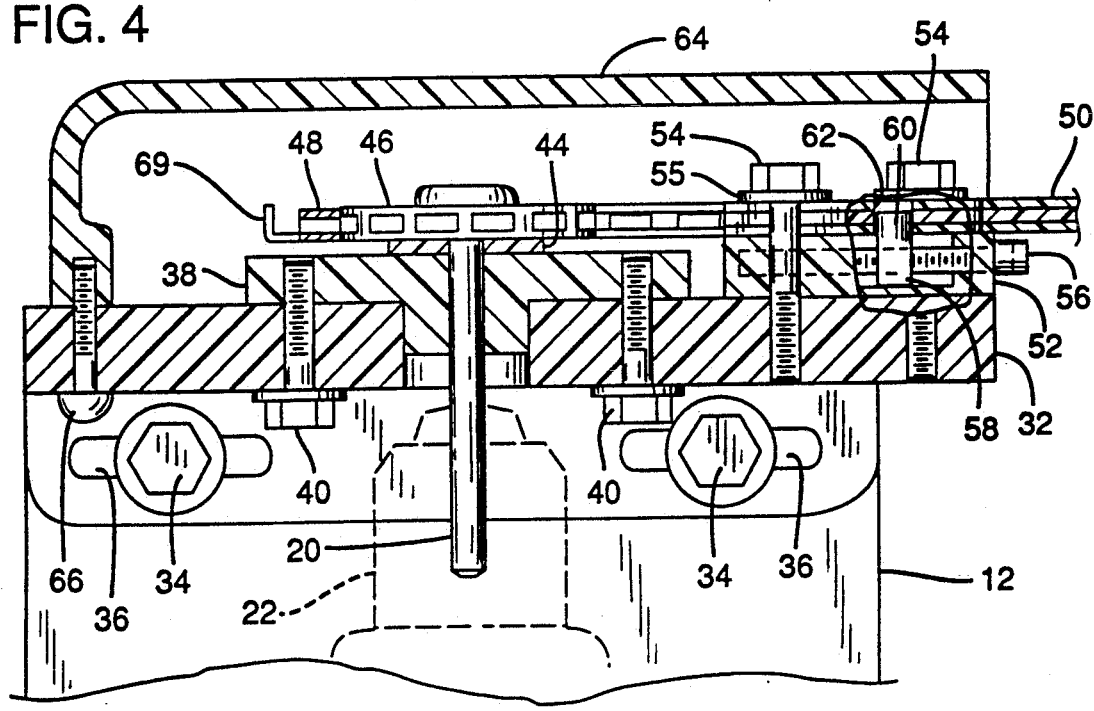
FIG. 4 is a cross sectional view on the line 4—4 in FIG. 1.

FIG. 4 shows the cutting chain 48 and chain bar 50 attached to the vertical support 32. A spacer block 52 is placed between the vertical support 32 and chain bar 50. The chain bar 50 is fastened to the spacer block 52 and the vertical support 32 by bolts 54 and washer 55.

An adjustment screw for loosening and tightening the cutting chain is shown at 56. Screw 56 rotates freely in spacer block 52 and is prevented from shifting longitudinally therein. A breakaway portion of FIG. 4 shows a nut 58 on the screw having a projection 60 slidable in a slot in block 52 and engaging a hole 62 in the chain bar 50 in FIG. 2. To make this adjustment the bolts 54 are loosened, only one of which appears in FIG. 2.

FIG. 2 shows the chain saw bar guard 64 which attaches to the vertical support 32 with bolts 66. The handle 68 attaches to the vertical support by bolts 70.

Figure 5A:
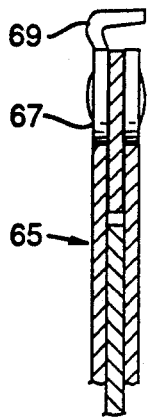
FIG. 5A is a cross sectional view of a conventional metal chain bar and chain on the line 5—5 in FIG. 1.

In FIG. 5A the prior art chain bar 65 is made of steel. The cutting chain 67 and its cutting teeth 69 are guided in the slot in the chain bar 65.

Figure 5B:
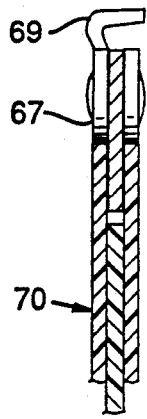
FIG. 5B is a similar view showing a non-metallic chain bar.

In FIG. 5B the chain saw bar 70 is made of plastic. The cutting chain 67 and cutting tooth 69 are the same as in FIG. 5A.

Figure 5C:
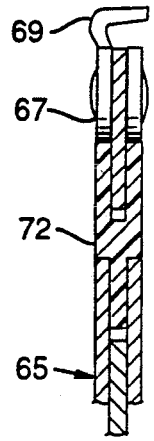
FIG. 5C is a similar view showing a metal bar with a plastic insert.

FIG. 5C shows plastic insert 72 in the prior art chain bar 65. The cutting chain 67 and cutting tooth 69 are the same as in FIGS. 5A and 5B. Insert 72 is Y shaped.

Figure 5D:
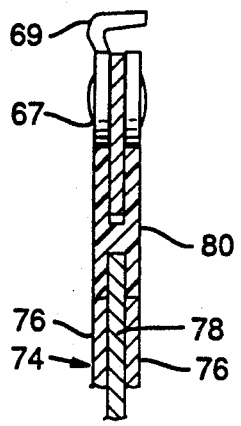
FIG. 5D is a similar view showing a metal bar with a different shape of plastic insert.

In FIG. 5D the chain bar 74 is made of steel with the two outside parts 76 shorter than the inside part 78. Thus the plastic insert 80 is in the form of an H. The bottom of insert 80 slips over inside part 78 of the steel chain bar and the outside legs of insert 80 butt against the two outside parts 76. The upper part of the insert carries the cutting chain 67 with its cutting teeth 69.

FIG. 2 shows a pair of branch stops 82, bolted to the chain bar 50 with bolts 84. This makes the chain saw a very good hedge trimmer.

Thus the present attachment provides a choice of two chain bars. It may be made of plastic which is non-abrasive, lighter than metal, non-corrosive and requires no oil. Or the chain bar may be made of metal having a plastic insert around its periphery to provide a guide track for the saw chain. In the latter form of construction a conventional shape of chain bar may be used or the cross section shape may be modified as described.

The present attachment unit has numerous advantages for the uses described. It is operable on a conventional hand drill, it is economical to purchase, it is ecology safe, it is fireproof, it is quiet, it produces no odor or fumes, it has two choices of power: 110 volt house current or direct current in a cordless drill, it supplies a large need for everyone with a yard, it is light in weight, it is simple and easy to use whereby it may be used by a person of almost any age, and it is simple and easy to manufacture, having only one sprocket, one bearing, one shaft and no gears.

What is claimed is:

1. A chain saw adapted to be powered by a hand drill having a drive shaft for rotating a drive sprocket in the chain saw, said chain saw comprising a base plate, means for securing the hand drill on said base plate, means for adjusting the position of the hand drill on said base plate in a direction of a drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing said hand drill on said base plate comprising a strap to be tightened around the hand drill and base plate, said means for adjusting the position of the hand drill comprising slots in said base plate for said strap, a cradle on said base plate for said hand drill, and bolts in said cradle extending through said slots in said base plate.

2. A chain saw adapted to be powered by a hand drill having a drive shaft for rotating a drive sprocket in the chain saw, said chain saw comprising a base plate, means for securing the hand drill on said base plate with a drill axis of rotation parallel to the plate, means for adjusting the position of the hand drill on said base plate in a direction of the drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing the hand drill on said base plate comprising a strap to be tightened around the hand drill and base plate, said means for adjusting the position of the hand drill comprising slots in said base plate for said strap, a cradle on said base plate for said hand drill, and bolts in said cradle extending through said slots in said base plate, said means for adjusting the position of said support plate on said base plate comprising bolts in said base plate extending through slots in an angled part of said support plate.

3. A chain saw adapted to be powered by a hand drill having a drive shaft for rotating a drive sprocket in the chain saw, said chain saw comprising a base plate, means for securing the hand drill on said base plate with a drill axis of rotation parallel to the plate, means for adjusting the position of the hand drill on said base plate in a direction of the drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing said hand drill on said base plate comprising a strap to be tightened around the hand drill and base plate, said means for adjusting the position of the hand drill comprising slots in said base plate for said strap, a cradle on said base plate for said hand drill, and bolts in said cradle extending through said slots in said base plate, said means for adjusting the position of the chain saw bar comprising bolts in the chain saw bar extending through slots in said support plate.

4. A hand drill powered chain saw comprising a hand drill having a drive shaft rotating a drive sprocket in said chain saw, a base plate, means for securing said hand drill on said base plate with a drill axis of rotation parallel to the plate, means for adjusting the position of the hand drill on said base plate in a direction of the drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing said hand drill on said base plate comprising a strap around the hand drill and base plate, said means for adjusting the position of the hand drill comprising slots in said base plate for said strap, a cradle on said base plate for said hand drill, and bolts in said cradle extending through said slots in said base plate.

5. A hand drill powered chain saw comprising a hand drill having a drive shaft rotating a drive sprocket in said chain saw, a base plate, means for securing said hand drill on said base plate with a drill axis of rotation parallel to the plate, means for adjusting the position of the hand drill on said base plate in a direction of the drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing said hand drill on said base plate comprising a strap around the hand drill and base plate, said means for adjusting the position of the hand drill comprising slots in said base plate for said strap, a cradle on said base plate for said hand drill, and bolts in said cradle extending through said slots in said base plate, said means for adjusting the position of said support plate on said base plate comprising bolts in said base plate extending through slots in an angled part of said support plate.

6. A hand drill powered chain saw comprising a hand drill having a drive shaft rotating a drive sprocket in said chain saw, a base plate, means for securing said hand drill on said base plate with a drill axis of rotation parallel to the plate, means for adjusting the position of the hand drill on said base plate in a direction of the drill axis of rotation, a support plate on said base plate perpendicular to said base plate, means for adjusting the position of said support plate in a direction parallel with said support plate and transverse to said axis of rotation, a chain saw bar mounted on said support plate parallel with the support plate, means for adjusting the position of the chain saw bar in a direction perpendicular to said base plate, said means for securing said hand drill on said base plate comprising a strap around the hand drill and base plate, said means for adjusting the position of the hand drill comprising slots in said base plate for said strap, a cradle on said base plate for said hand drill, and bolts in said cradle extending through said slots in said base plate, said means for adjusting the position of the chain saw bar comprising bolts in the chain saw bar extending through slots in said support plate.

7. The chain saw of any one of claims 1-6 wherein said chain saw bar is made of plastic.

8. The chain saw of any one of claims 1-6 wherein said chain saw bar is made of steel, and said chain saw further comprises a plastic insert between said chain saw bar and a saw chain of said chain saw.

* * * * *